(12) United States Patent
Scott et al.

(10) Patent No.: US 8,452,583 B2
(45) Date of Patent: *May 28, 2013

(54) METHOD OF USING VISUAL SEPARATORS TO INDICATE ADDITIONAL CHARACTER COMBINATIONS ON A HANDHELD ELECTRONIC DEVICE AND ASSOCIATED APPARATUS

(75) Inventors: Sherryl Lee Lorraine Scott, Waterloo (CA); Zaheen Somani, Richmond (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,398

(22) Filed: Jul. 2, 2012

(65) Prior Publication Data

US 2012/0271628 A1  Oct. 25, 2012

Related U.S. Application Data

(63) Continuation of application No. 13/175,560, filed on Jul. 1, 2011, now Pat. No. 8,239,187, which is a continuation of application No. 12/649,922, filed on Dec. 30, 2009, now Pat. No. 8,005,663, which is a continuation of application No. 11/558,581, filed on Nov. 10, 2006, now Pat. No. 7,664,632.

(51) Int. Cl.
*G06F 17/28* (2006.01)

(52) U.S. Cl.
USPC ........... 704/3; 704/200; 704/1; 704/9; 704/10

(58) Field of Classification Search
USPC ........................................ 704/200, 1, 3, 9, 10
See application file for complete search history.

(56) References Cited

U.S. PATENT DOCUMENTS

| | | | |
|---|---|---|---|
| 5,739,744 A * | 4/1998 | Roca et al. | 341/20 |
| 2002/0080137 A1 | 6/2002 | Ko | |
| 2005/0027534 A1 * | 2/2005 | Meurs et al. | 704/270 |
| 2005/0162395 A1 | 7/2005 | Unruh | |
| 2005/0268231 A1 * | 12/2005 | Wen et al. | 715/534 |
| 2005/0283358 A1 * | 12/2005 | Stephanick et al. | 704/7 |
| 2006/0058995 A1 | 3/2006 | Fux et al. | |
| 2006/0101503 A1 | 5/2006 | Venkataraman et al. | |
| 2007/0016862 A1 | 1/2007 | Kuzmin | |
| 2010/0146386 A1 | 6/2010 | Ma et al. | |

FOREIGN PATENT DOCUMENTS

| | | |
|---|---|---|
| EP | 1347361 A1 | 3/2002 |
| EP | 1701241 A1 | 3/2005 |

* cited by examiner

*Primary Examiner* — Qi Han
(74) *Attorney, Agent, or Firm* — Finnegan, Henderson, Farabow, Garrett & Dunner, LLP

(57) ABSTRACT

A method and associated apparatus for using visual separators to indicate additional character combination choices from a disambiguation function on a handheld electronic device.

16 Claims, 4 Drawing Sheets

METHOD OF USING VISUAL SEPARATORS TO INDICATE ADDITIONAL CHARACTER COMBINATIONS ON A HANDHELD ELECTRONIC DEVICE AND ASSOCIATED APPARATUS

CROSS-REFERENCE TO RELATED APPLICATIONS

This is a continuation of co-pending application Ser. No. 13/175,560, filed Jul. 1, 2011, which is incorporated herein by reference, which is a continuation of patented application Ser. No. 12/649,922, filed Dec. 30, 2009, issued as U.S. Pat. No. 8,005,663, which is incorporated herein by reference, which is a continuation of patented Ser. No. 11/558,581, filed Nov. 10, 2006, issued as U.S. Pat. No. 7,664,632, which is incorporated herein by reference.

BACKGROUND

1. Field

The disclosed and claimed concept relates generally to handheld electronic devices that employ a text disambiguation function and, more particularly, to an improved method of displaying character combination choices that are generated by a text disambiguation function on the handheld electronic device.

2. Description of the Related Art

Numerous types of handheld electronic devices are known. Examples of such handheld devices include, for instance, personal data assistants (PDAs), handheld computers, two-way pagers, cellular telephones, and the like. Many handheld electronic devices also feature wireless communication capability, although many such handheld devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable.

One way of providing numerous letters in a small space has been to provide a "reduced keyboard" in which multiple letters, symbols, and/or digits, and the like, are assigned to any given key. For example, a touch-tone telephone includes a reduced keyboard by providing twelve keys, of which ten have digits thereon, and of these ten keys, eight have letters assigned thereto. For instance, one of the keys includes the digit "2" as well as the letters "A", "B", and "C" assigned thereto. Since a single actuation of such a key potentially could be intended by the user to refer to any of the letters "A", "B", and "C", and potentially could also be intended to refer to the digit "2", the input (by actuation of the key) generally is an ambiguous input and is in need of some type of disambiguation in order to be useful for text entry purposes.

In order to enable a user to make use of the multiple letters, digits, and the like on any given key in a reduced keyboard, a software-based text disambiguation function is utilized. In such a system, a user typically presses keys to which one or more characters have been assigned, generally pressing each key one time for each desired letter, and the disambiguation software attempts to disambiguate the intended input. One example of such a system is disclosed in U.S. patent application Ser. No. 10/931,281, entitled "Handheld Electronic Device With Text Disambiguation," the disclosure of which is incorporated herein by reference. As is known, many such systems display an output component as the user is typing (pressing keys) that includes a list of possible intended input character strings (i.e., possible interpretations of what the user intended while typing) that are generated by the disambiguation software.

In many current software-based text disambiguation systems, an output component, which includes the list of possible intended inputs that is generated by the disambiguation software, is output on the display of the handheld electronic device. A problem arises when the length of a possible intended input is so large that the remaining possible intended inputs cannot fit on the display. Additionally, another problem also arises when the number of possible intended inputs is so high that all of the possible intended inputs cannot fit on the display. In these situations, the list is typically split and the user must take some additional action, such as scrolling a thumbwheel or pressing a predetermined function button, to move from one possible intended input to the next possible intended input. The shortcoming with current systems, however, is that the indicators, which indicate that there are additional possible intended inputs beyond the one possible intended input that is currently being displayed, do not adequately tell the user where the additional possible intended inputs are located in relation to the possible intended input that is currently being displayed.

BRIEF DESCRIPTION OF THE DRAWINGS

A full understanding of the disclosed and claimed concept can be gained from the following description when read in conjunction with the accompanying drawings in which:

DESCRIPTION

Figure 1:
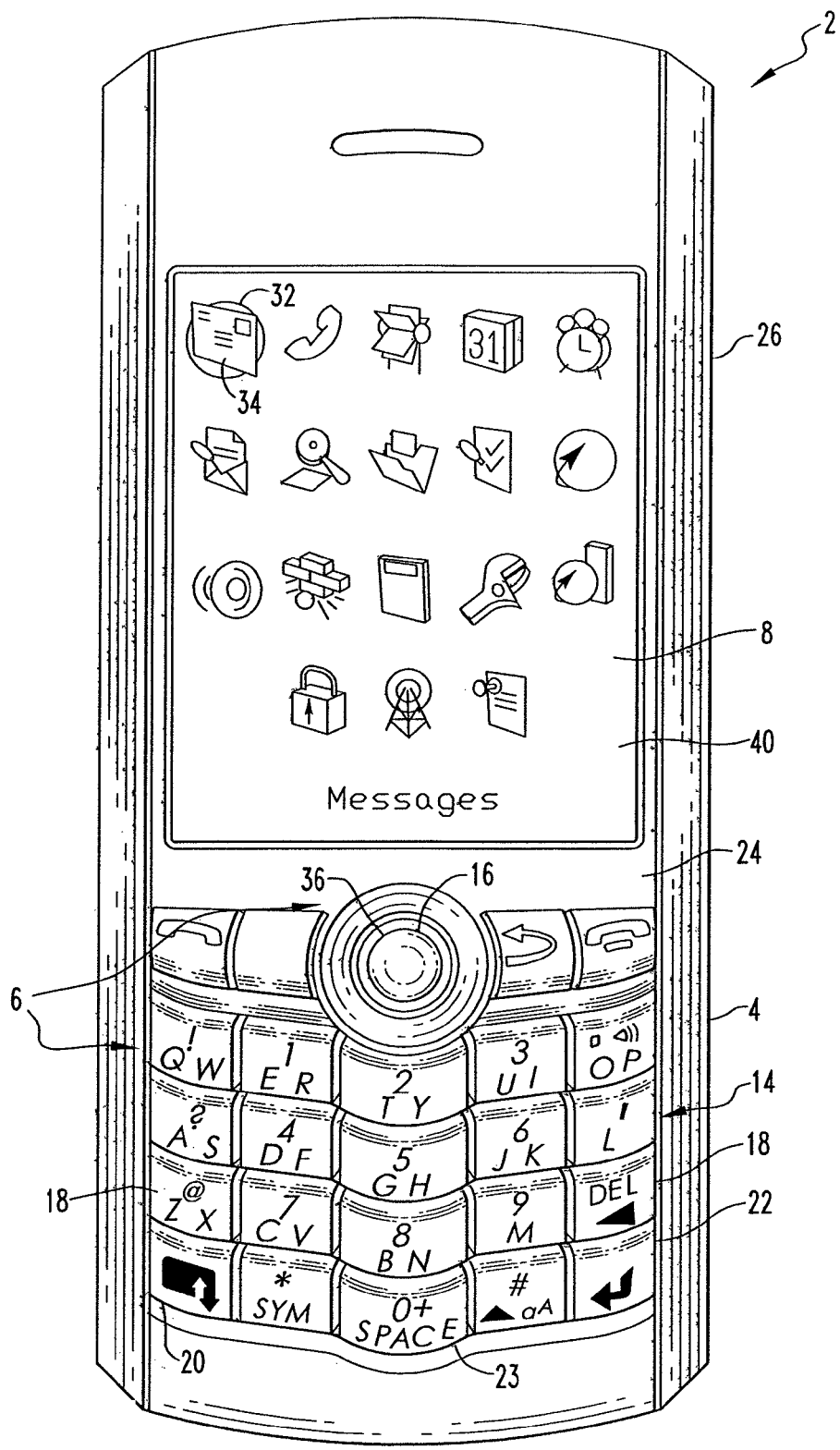
FIG. 1 is a top plan view of an embodiment of an improved handheld electronic device in accordance with the disclosed and claimed concept.

As used herein, the phrase "a number of" or variations thereof means one or an integer greater than one.

As used herein, the phrase "alphanumeric" or variations thereof shall broadly refer to a letter, such as a Latin letter, and/or a digit such as, without limitation, 1, 2, 3, 4, 5, 6, 7, 8, 9, 0, and combinations thereof.

Directional phrases used herein, such as, for example, upper, lower, left, right, vertical, horizontal, top, bottom, above, beneath, clockwise, counterclockwise and derivatives thereof, relate to the orientation of the elements shown in the drawings and are not limiting upon the claims unless expressly recited therein.

One embodiment of a handheld electronic device 2 in accordance with the disclosed and claimed concept is depicted generally in FIG. 1. The handheld electronic device 2 of FIG. 1 is depicted schematically in FIG. 2. The handheld electronic device 2 includes a housing 4 upon which are disposed a processor unit that includes an input apparatus 6, an output apparatus 8, a processor 10, a memory 12, and a wireless transceiver 13. The processor 10 may be, for instance, and without limitation, a microprocessor (μP) and is responsive to inputs from the input apparatus 6 and provides output signals to the output apparatus 8. The processor 10 also interfaces with the memory 12 which, as will be discussed in greater detail below, contains one or more routines that are used to implement the disclosed and claimed concept. The processor 10 and the memory 12 together form a processor apparatus.

Referring to FIG. 1, the input apparatus 6 includes a keypad 14 and a navigational input member 16. The keypad 14 is in the exemplary form of a reduced QWERTY keyboard including a plurality of keys 18 that serve as input members. Many of the keys 18 each have a plurality of characters assigned thereto. The keypad 14 also includes an <ALT> key 20, an <ENTER> key 22, and a <SPACE> key 23. It is noted, however, that the keypad 14 may be of other configurations, such as an AZERTY keyboard, a QWERTY keyboard, a QWERTZ keyboard or another keyboard arrangement, whether or not reduced, and whether presently known or unknown.

The keys 18 are located on a front face 24 of the housing 4, and the navigational input member 16, which is in the exemplary form a trackball 36, is disposed on the front face 24 of the housing 4 as well. The trackball 36 is rotatable in various directions thereby allowing for the navigation of the cursor 32, which is displayed on the output apparatus 8, in various directions including up, down, left, right, and any combination thereof. Moreover, the trackball 36 can also be depressed to provide a selection or other input based upon the current location of the cursor 32. Accordingly, rotation of the trackball 36 can navigate the cursor 32 over a particular program icon 34, while depression of the trackball 36 can launch the program. It should be noted that a trackwheel (not shown), which can be disposed on a side 26 of the housing 4, can be used in lieu of the trackball 36. Similar to the trackball 36, the trackwheel can serve as an input member since the trackwheel is capable of being rotated in a clockwise or a counterclockwise direction as well as being depressed. Rotation of the trackwheel can provide a navigation or other input, while depression of the trackwheel can provide a selection or other input. For example, if a cursor 32 is located over a given program icon 34, that program will be launched when the trackwheel is depressed.

Figure 2:
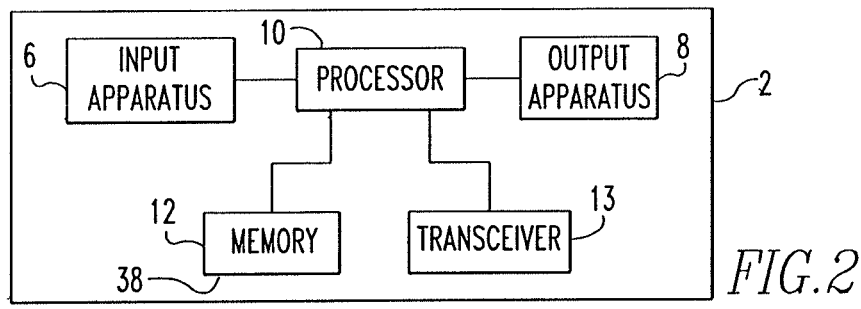
FIG. 2 is a schematic depiction of the handheld electronic device of FIG. 1.

Referring to FIG. 2, the memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. As can be seen from FIG. 2, the memory 12 is in electronic communication with the processor 10. The memory 12 additionally can include one or more routines depicted generally with the numeral 38 for the processing of data. The routines 38 can be in any of a variety of forms such as, without limitation, software, firmware, and the like.

Figure 3:
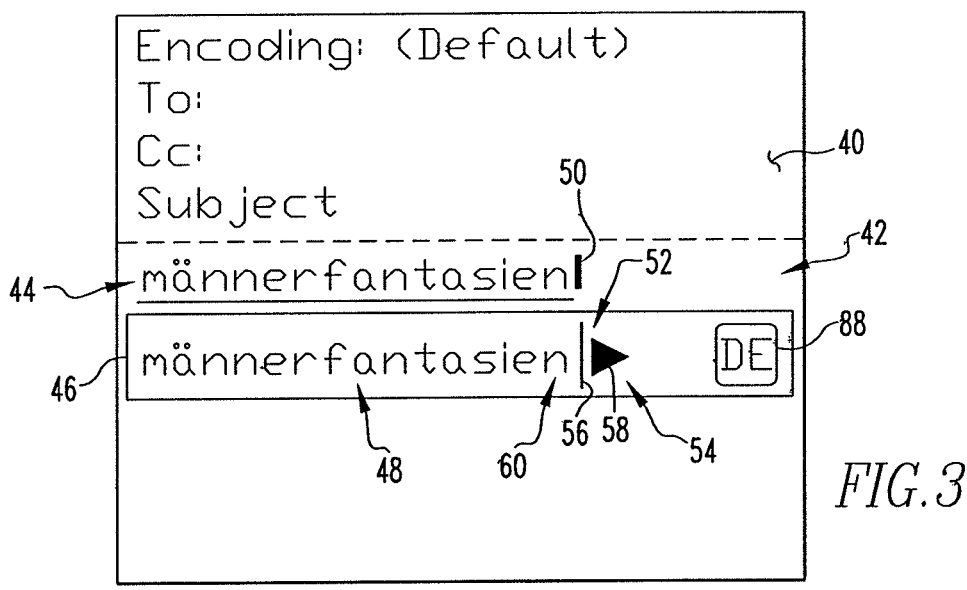
FIGS. 3, 3A, and 3B each depict an output that can be generated on the improved handheld electronic device of FIG. 1.
Figure 3A:
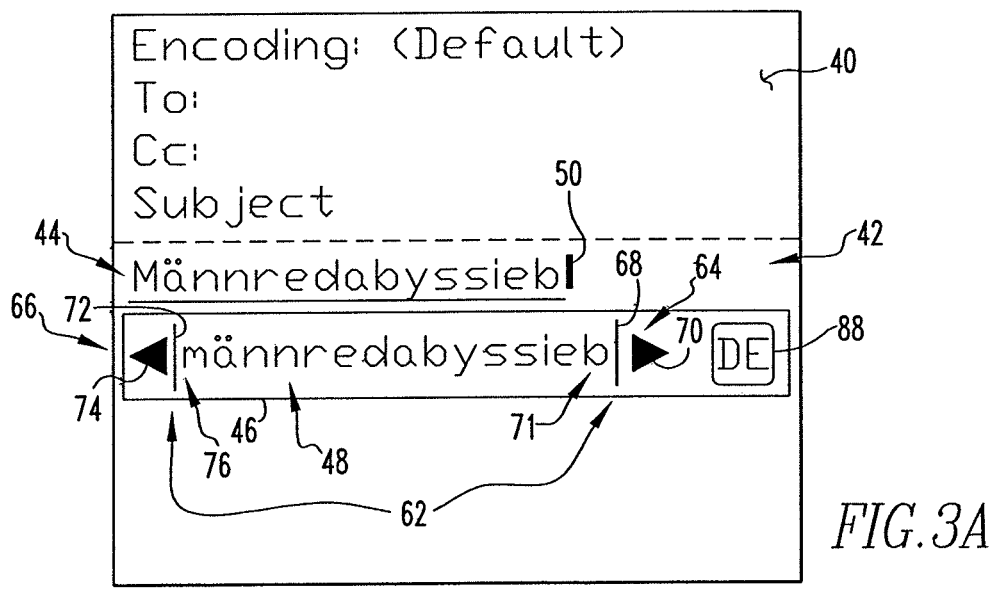
Figure 3B:
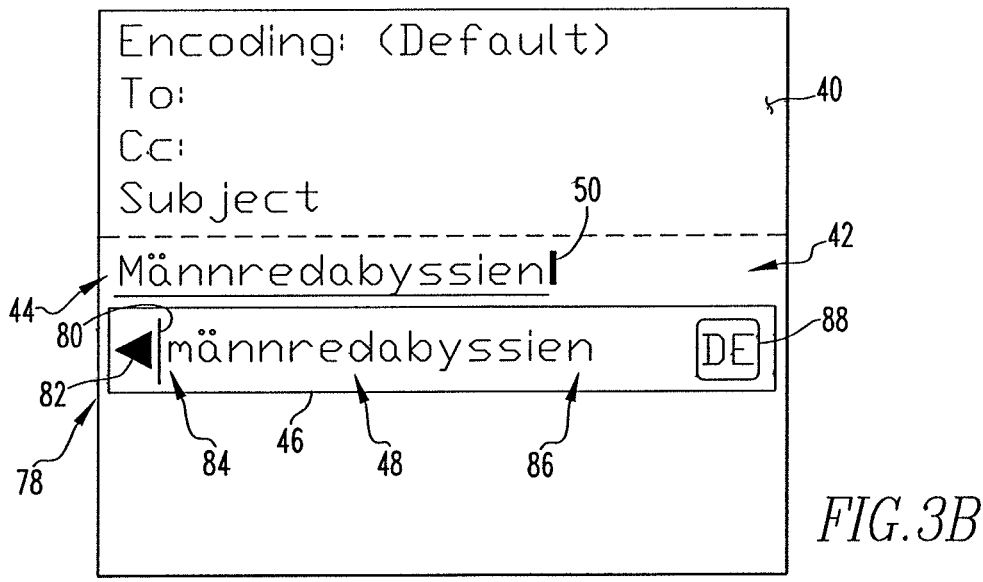

The output apparatus 8 includes a display 40 upon which can be provided an output 42. A number of exemplary outputs 42 are depicted on the display 40 in FIGS. 3, 3A, and 3B. Each exemplary output 42 includes a text component 44 and a variant component 46. As can be seen from these figures, the variant component 46 extends substantially horizontally across the display 40. This, however, is not meant to be limiting since the variant component 46 can also extend across the display 40 substantially vertically or can be otherwise disposed. Preferably, the variant component 46 is located generally in the vicinity of the text component 44. Referring to FIGS. 3, 3A, and 3B, the variant component 46 includes a selectable output 48 that can be selected by the user for possible output on the output apparatus 8 of the handheld electronic device 2. The display 40 also includes a caret (cursor) 50 in the text component 44 which depicts generally where the next output will be displayed.

As stated above, a shortcoming of current disambiguation systems is that indicators, which indicate that there are additional possible intended inputs beyond the one or more possible intended inputs that are currently being displayed, do not adequately tell the user of the handheld electronic device 2 where the additional possible intended inputs may be found.

The disclosed concept enables the handheld electronic device 2 to overcome this shortcoming by having a routine 38 that is adapted to display a single visual separator which not only represents that additional subsets of the list of possible intended inputs (character combination choices) are displayable on the output apparatus 8 of the handheld electronic device 2 in response to the handheld electronic device 2 detecting a navigational input in a particular direction, but it also represents the direction in which the additional subsets may be found.

By way of example, referring to FIGS. 1, 3, 3A, and 3B, when the language that is currently operative on the handheld electronic device 2 is German and the user actuates the keys 18 on the handheld electronic device 2 that correspond to "mannerfantasien", the disambiguation function of the handheld electronic device 2 will generate a list of three possible intended inputs in response to the detected ambiguous key sequence. The three possible intended inputs are as follows: (1) männerfantasien (hereinafter, referred to as the first subset), (2) männredabyssieb (hereinafter, referred to as the second subset), and (3) männredabyssien (hereinafter, referred to as the third subset). The variant component 46, however, is unable to contain all three possible intended inputs simultaneously due to the length of each possible intended input. Accordingly, the handheld electronic device 2 will display only one possible intended input (i.e., a subset of the three possible inputs) within the variant component 46 at any one time. It should be noted, however, that despite FIGS. 3, 3A, and 3B depicting one possible intended input, in its entirety, being displayed within the variant component 46, there may be instances when only a portion of the possible intended input is displayed within the variant component 46.

Continuing with FIG. 3, upon detecting the ambiguous key sequence that corresponds with "mannerfantasien", the handheld electronic device 2 will display "männerfantasien" within the variant component 46 as well as in the text component 44. As stated above, the variant component 46 is unable to simultaneously contain all of the possible intended inputs. Therefore, in order to assist the user in data entry, a first visual separator 52 is displayed in the variant component 46 that allows the user to ascertain whether or not there are additional subsets available and where the additional subsets may be found. It should be noted that despite FIG. 3 depicting the first visual separator 52 as being located in the variant component 46, the first visual separator 52 can be located anywhere on the display 40. The first visual separator 52 represents that additional possible intended inputs are displayable within the variant component 46, in place of the first subset, if the handheld electronic device 2 detects a navigational input in a first direction. That is, the first visual separator 52 visually separates an object that is being output on the display 40 from another object, whether or not the another object is also being currently output on the display 40. In the embodiment that is depicted in FIG. 3, the first visual separator 52 is a graphic 54 having a portion 56 that is elongated vertically and a pointing portion 58 that points horizontally towards the first direction. The elongated portion 56 of first visual separator 52 is also positioned adjacent a first end 60 of the first subset which is indicative of a navigational input in a first direction. That is, the first visual separator 52 is positioned in the first direction with respect to the first subset, and this provides an indication of the ability of a navigational input in the first direction to retrieve additional character combination choices that are undisplayed but are logically disposed in the first direction with respect to the first subset. Accordingly, when the handheld electronic device 2 detects a navigational input from the trackball 36 to the "right" or a clockwise rotation of a trackwheel (if a trackwheel is being used as the navigational input member 16), either of which would be an input in the first direction, the handheld electronic device 2 will replace "männerfantasien" with the second subset, "männredabyssieb", in addition to replacing the first visual separator 52 with a second visual separator 62.

Continuing with FIG. 3A, as can be seen from this figure, "männerfantasien" has been replaced with "männredabyssieb" in the variant component 46 as well as in the text component 44. Moreover, the first visual separator 52 has been replaced with the second visual separator 62 which comprises a first component 64 and a second component 66. The first component 64 comprises a portion 68 that is elongated vertically and a pointing portion 70 that points horizontally towards the first direction. Moreover, the first component 64 is also positioned adjacent a first end 71, i.e., the terminus, of the second subset which is indicative of a navigational input in the first direction. The second component 66 comprises a portion 72 that is elongated vertically and a pointing portion 74 that points horizontally towards a second direction. Unlike the first component 64, the second component 66 is positioned adjacent a second end 76, i.e., the beginning, of the second subset which is indicative of a navigational input in the second direction. Similar to the first visual separator 52, the first component 64 of the second visual separator 62 represents that additional possible intended inputs are displayable within the variant component 46 if the handheld electronic device 2 detects a navigational input in the first direction. However, unlike the first visual separator 52, the second component 66 of the second visual separator 62 also represents that the first subset can be displayable within the variant component 46 if the handheld electronic device 2 detects a navigational input in a second direction. Specifically, the second visual separator 62 represents that a third subset is displayable within the variant component 46, in place of the second subset, if the handheld electronic device 2 detects a navigational input in the first direction (i.e., to the "right") while the first subset is displayable within the variant component 46, in place of the second subset, if the handheld electronic device 2 detects a navigational input in the second direction (i.e., to the "left"). That is, the first component 64 is positioned in the first direction with respect to the second subset, and this provides an indication of the ability of a navigational input in the first direction to retrieve additional character combination choices that are undisplayed but are logically disposed in the first direction with respect to the second subset. Moreover, the second component 66 is positioned in the second direction with respect to the second subset, and this provides an indication of the ability of a navigational input in the second direction to retrieve additional character combination choices that are undisplayed but are logically disposed in the second direction with respect to the second subset.

Upon detecting a navigational input to the "right" or a clockwise rotation of the trackwheel, the handheld electronic device 2 will display the third subset in place of the second subset. Specifically, "männredabyssieb" will be replaced with the third subset, "männredabyssien", in both the variant component 46 and the text component 44 (see FIG. 3B). When this occurs, the second visual separator 62 will also be replaced with a third visual separator 78.

Alternatively, if the handheld electronic device 2 detects a navigational input to the "left" or a counterclockwise rotation of the trackwheel, either of which would provide a navigational input in the second direction, then the handheld electronic device 2 will replace "männredabyssieb" with the first subset, "männerfantasien", in addition to replacing the second visual separator 62 with the first visual separator 52.

Continuing with FIG. 3B, as can be seen from this figure, "männredabyssieb" has been replaced with the third subset, "männredabyssien", in the variant component 46 as well as in the text component 44 because the handheld electronic device 2 detected a navigational input in the first direction. Additionally, the second visual separator 62 has been replaced with a third visual separator 78 which comprises a portion 80 that is elongated vertically and a pointing portion 82 that points horizontally towards the second direction. As can be seen from this figure, the third visual separator 78 is positioned adjacent a second end 84 of the third subset which is indicative of a navigational input in the second direction. The third visual separator 78 represents that the second subset is displayable within the variant component 46 in place of the third subset if the handheld electronic device 2 detects a navigational input in the second direction. Moreover, the third visual separator 78 also represents that "männredabyssien" is the final choice among the possible intended inputs by not having another component positioned adjacent a first end 86 of the third subset.

Upon detecting a navigational input to the "left" or a counterclockwise rotation of the trackwheel, the handheld electronic device 2 will replace "männredabyssien" with the second subset, "männredabyssieb", in both the variant component 46 and the text component 44 (see FIG. 3A). Additionally, the third visual separator 78 will be replaced with the second visual separator 62.

Alternatively, if the handheld electronic device 2 detects a navigational input to the "right" or a clockwise rotation of the trackwheel, then the handheld electronic device 2 will replace "männredabyssien" with the first subset, "männerfantasien", in both the variant component 46 and the text component 44 in addition to replacing the third visual separator 78 with the first visual separator 52. In other words, a navigational input to the "right" or a clockwise rotation of the trackwheel enables the user to continuously scroll through the subsets.

It should be noted that in FIGS. 3, 3A, and 3B, a language indicator 88 is provided in the variant component 46. The language indicator 88 is representative of a language that is currently operable on the handheld electronic device 2. In these figures, "DE" represents that German is the language that is currently operative on the handheld electronic device 2.

It should also be noted that in other embodiments, the first, second, and third visual indicator 52, 62, 78 may not have their respective pointing portions 58, 70, 74, 82.

Figure 4:
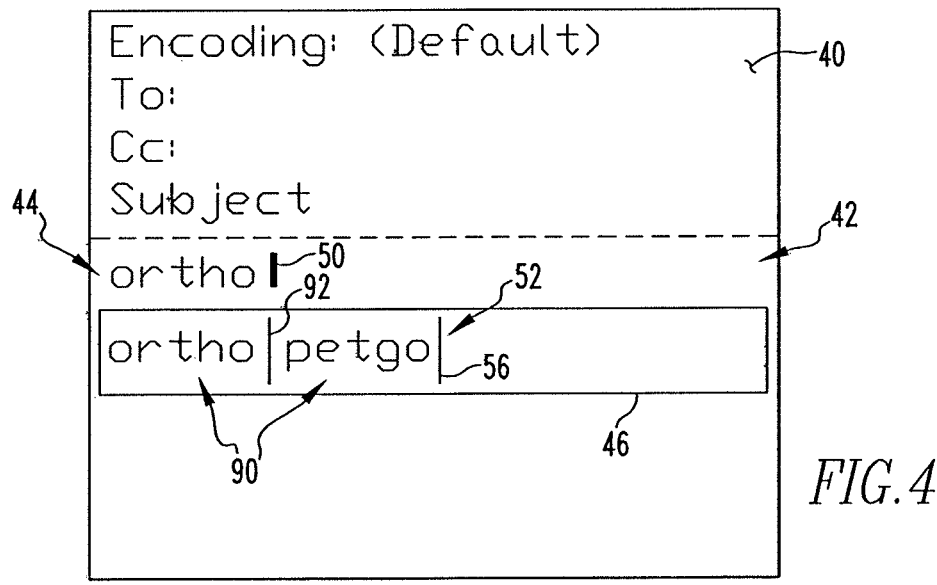
FIG. 4 depicts another output that can be generated on the improved handheld electronic device of FIG. 1.

Referring to FIG. 4, in yet another embodiment, the first subset could comprise a plurality of alternative character choices 90 wherein each pair of adjacent alternative character combination choices is separated by a visual separator 92 having a common appearance to the first visual separator 52. In this particular embodiment, the variant component 46 does not have a language indicator 88 and the first visual separator 52 comprises only a portion 56 that is vertically elongated.

Figure 5:
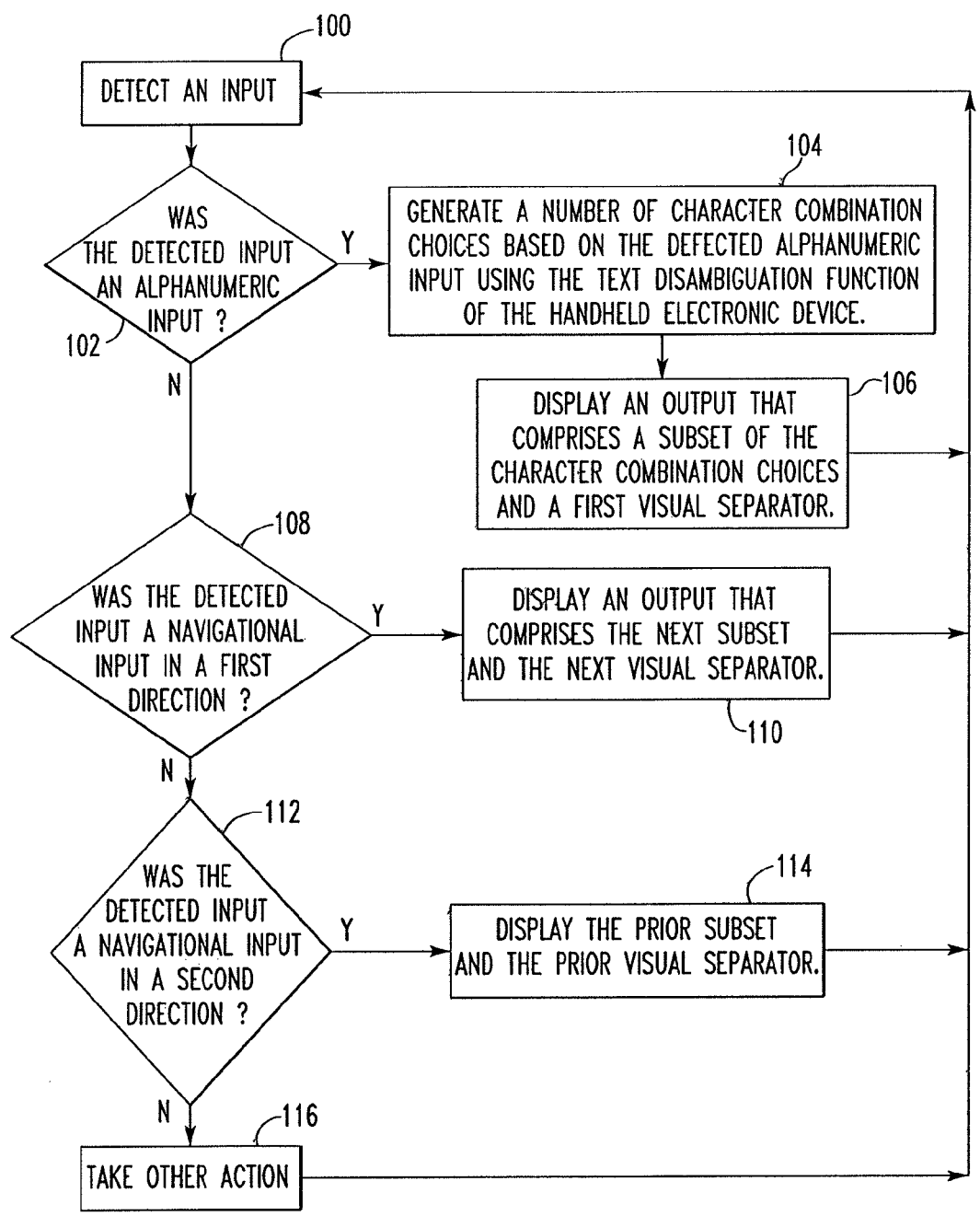
FIG. 5 is a flowchart depicting one embodiment of an improved method in accordance with the disclosed and claimed concept.

FIG. 5 is a flowchart depicting one embodiment of the disclosed concept. As can be seen from this figure, the handheld electronic device 2 will detect an input at step 100. The handheld electronic device 2 will then determine whether the detected input was an alphanumeric input at step 102.

If the handheld electronic device 2 does determine at step 102 that the detected input was an alphanumeric input, then the handheld electronic device 2 will generate a number of character combination choices based on the detected alphanumeric input using the text disambiguation function of the handheld electronic device 2 at step 104. The handheld electronic device 2 will then display an output that comprises a subset of the character combination choices in addition to a first visual separator 52 at step 106. For example, referring to FIG. 3, the handheld electronic device 2 would display the first subset, "männerfantasien", in addition to the first visual separator 52 in response to determining at step 102 that the detected input was an alphanumeric input. Continuing with FIG. 5, after the output has been displayed at step 106, the handheld electronic device 2 will then return to step 100.

If the handheld electronic device 2 determines that the detected input is not an alphanumeric input, then the handheld electronic device 2 will determine whether the detected input is a navigational input in a first direction at step 108. If the handheld electronic device 2 does determine that the detected input is a navigational input in the first direction at step 108, then the handheld electronic device 2 will display an output that comprises the next subset of the character combination choices as well as the next visual separator. For example, referring to FIG. 3A, the handheld electronic device 2 would display the second subset, "männredabyssieb", in place of the first subset in addition to displaying the second visual separator 62 in place of the first visual separator 52. After the output has been displayed at step 110, the handheld electronic device 2 will return to step 100.

The handheld electronic device 2 will then detect yet another input at step 100. Responsive to detecting the input, the handheld electronic device 2 will determine whether the detected input was an alphanumeric input at step 102. If the handheld electronic device 2 determines that the input detected at step 102 is not an alphanumeric input, then the handheld electronic device 2 will determine whether the detected input is a navigational input in a first direction at step 108.

If the handheld electronic device 2 does determine that the detected input is a navigational input in the first direction at step 108, then the handheld electronic device 2 will display an output that comprises the next subset of the character combination choices as well as the next visual separator. For example, referring to FIG. 3B, the handheld electronic device 2 would display the third subset, "männredabyssien", in place of the second subset in addition to displaying the third visual separator 78 in place of the second visual separator 62. After the output has been displayed at step 110, the handheld electronic device 2 will go to step 100.

Alternatively, if the handheld electronic device 2 determines that the detected input is not a navigational input in the first direction at step 108, then the handheld electronic device 2 will determine whether the detected input was a navigational input in a second direction at step 112.

If the handheld electronic device 2 does determine that the detected input is a navigational input in the second direction at step 112, then the handheld electronic device 2 will display an output that comprises the prior subset and the prior visual separator at step 114. For example, referring to FIG. 3A, the handheld electronic device 2 would display the second subset, "männredabyssieb", in place of the third subset in addition to displaying the second visual separator 62 in place of the third visual separator 78. After the output has been displayed at step 110, the handheld electronic device 2 will return to step 100.

Alternatively, if the handheld electronic device 2 determines that the detected input was not a navigational input in the second direction at step 112, then the handheld electronic device 2 will take other action such as, without limitation, determining whether the detected input was a selection input at step 116.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input on a handheld electronic device having at least one processor and a display, comprising:
generating, using the at least one processor, a set of character combinations based, at least in part, on a first input;
displaying on the display a variant component and a first visual separator, said variant component comprising a first subset of said set of character combinations, said first visual separator indicating the availability of a second subset of said set of character combinations in response to a navigational input in a first direction; and
responsive to detecting a navigational input in said first direction, displaying on the display said second subset and a second visual separator having a first component and a second component, said first component indicating the availability of a third subset of said set of character combinations in response to a navigational input in said first direction, said second component indicating the availability of said first subset in response to a navigational input in a second direction.

2. The method according to claim 1, further comprising:
detecting another navigational input in said first direction;
displaying on the display said third subset; and
displaying on the display a third visual separator indicating the availability of said second subset in response to a navigational input in said second direction.

3. The method according to claim 2, further comprising:
detecting another navigational input in said first direction; and
redisplaying on the display at least a portion of said first subset in place of at least a portion of said third subset, and displaying said first visual separator.

4. The method according to claim 1, further comprising displaying on the display as said first visual separator a graphic having a portion that is elongated in a vertical direction.

5. The method according to claim 1, further comprising displaying on the display as said first visual separator a graphic having a portion that is elongated in a vertical direction and a pointing portion that points horizontally towards said first direction.

6. The method according to claim 1, further comprising:
displaying on the display as said first component of said second visual separator a graphic having a portion that is elongated in a vertical direction and a first pointing portion that points horizontally towards said first direction; and
displaying on the display as said second component of said second visual separator a graphic having a portion that is elongated in said vertical direction and a second pointing portion that points horizontally towards said second direction.

7. The method according to claim 1, wherein said first subset comprises a plurality of alternative character combinations, said method further comprising displaying a visual separator between each adjacent pair of alternative character combinations.

8. The method according to claim 7, further comprising:
displaying on the display as each of said first visual separator, said first component of said second visual separator, said second component of said second visual separator, and said visual separator between each adjacent pair of alternative character combinations, a graphic having a common visual appearance.

9. A handheld electronic device, comprising:
a display;
a processor; and
a memory having stored therein a routine that, when executed by the processor, causes said handheld electronic device to:
generate a set of character combinations based, at least in part, on a first input;
display a variant component and a first visual separator, said variant component comprising a first subset of said set of character combinations, said first visual separator indicative of the availability of a second subset of said set of character combinations in response to a navigational input in a first direction; and
responsive to a navigational input in said first direction, display said second subset and a second visual separator having a first component and a second component, said first component indicative of the availability of a third subset of said set of character combinations in response to a navigational input in said first direction, said second component indicative of the availability of said first subset in response to a navigational input in a second direction.

10. The handheld electronic device according to claim 9, wherein said set of routines cause said handheld electronic device to perform operations further comprising:
detecting another navigational input in said first direction;
displaying said third subset; and
displaying on the display a third visual separator indicating the availability of said second subset in response to a navigational input in said second direction.

11. The handheld electronic device according to claim 10, wherein said set of routines cause said handheld electronic device to perform operations further comprising:
detecting as another input a navigational input in said first direction; and
redisplaying at least a portion of said first subset in place of at least a portion of said third subset, and displaying said first visual separator.

12. The handheld electronic device according to claim 9, wherein said first visual separator comprises a graphic having a portion that is elongated in a vertical direction.

13. The handheld electronic device according to claim 9, wherein said first visual separator comprises a graphic having a portion that is elongated in a vertical direction, and a pointing portion that points horizontally towards said first direction.

14. The handheld electronic device according to claim 9, wherein said first component of said second visual separator comprises a graphic having a portion that is elongated in a vertical direction and a first pointing portion that points horizontally towards said first direction, and wherein said second component of said second visual separator comprises a graphic having a portion that is elongated in a vertical direction and a second pointing portion that points horizontally towards said second direction.

15. The handheld electronic device according to claim 9, wherein said first subset comprises a plurality of alternative character combinations, and wherein said set of routines cause said handheld electronic device to perform operations further comprising:
displaying a visual separator between each adjacent pair of alternative character combinations.

16. The handheld electronic device according to claim 15, wherein each of said first visual separator, said first component of said second visual separator, said second component of said second visual separator, and said visual separator between each adjacent pair of alternative character combinations comprise a graphic having a common visual appearance.

* * * * *

UNITED STATES PATENT AND TRADEMARK OFFICE
CERTIFICATE OF CORRECTION

| | | |
|---|---|---|
| PATENT NO. | : 8,452,583 B2 | Page 1 of 1 |
| APPLICATION NO. | : 13/540398 | |
| DATED | : May 28, 2013 | |
| INVENTOR(S) | : Sherryl Lee Lorraine Scott et al. | |

It is certified that error appears in the above-identified patent and that said Letters Patent is hereby corrected as shown below:

In the Drawings:

In FIG. 5, block 104, line 2, "DEFECTED" should read --DETECTED--.

In the Specifications:

In column 3, line 27, "form a trackball 36," should read --form of a trackball 36,--.

Signed and Sealed this
Twenty-third Day of July, 2013

Teresa Stanek Rea
*Acting Director of the United States Patent and Trademark Office*